Aug. 10, 1954     F. W. ALBAUGH     2,685,930
OIL WELL PRODUCTION PROCESS
Filed Aug. 12, 1948
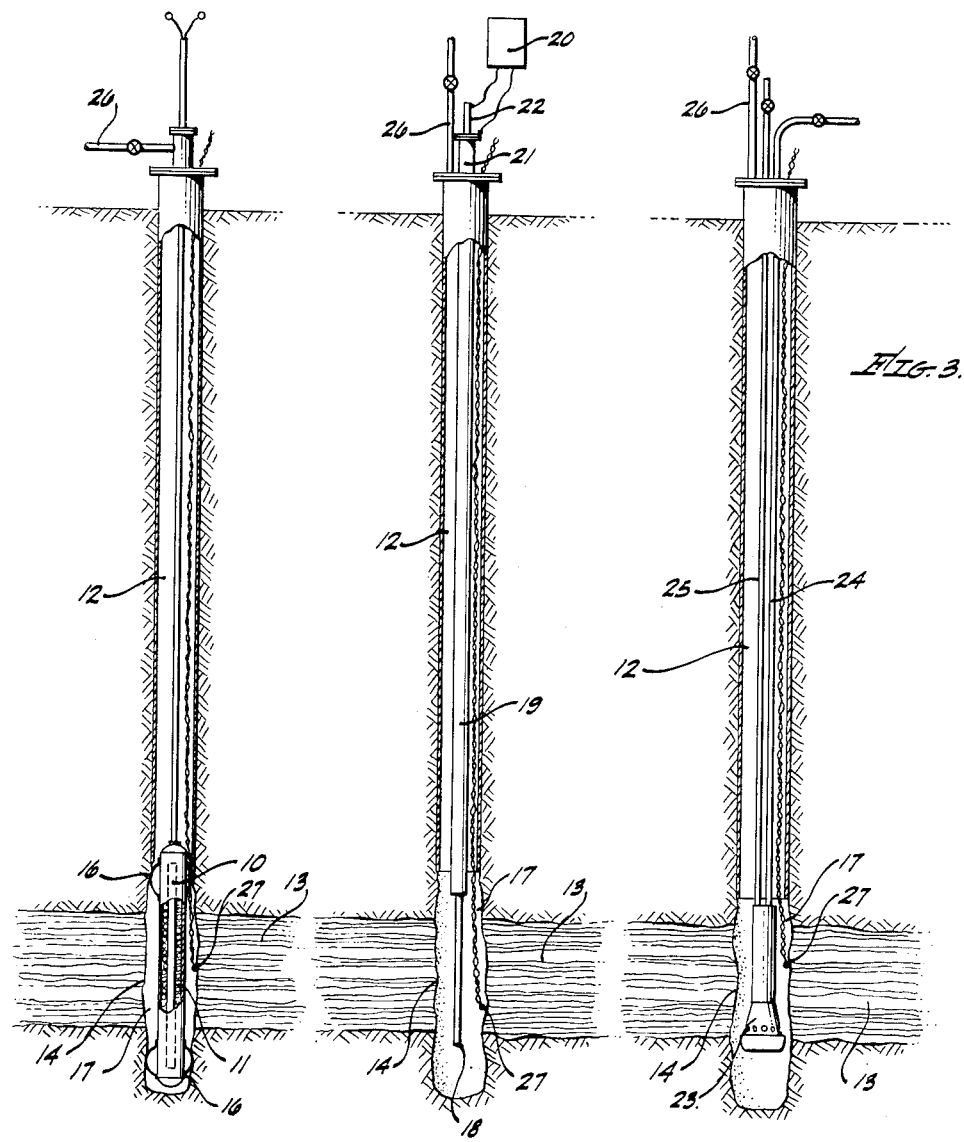
INVENTOR.
FREDERICK W. ALBAUGH,
BY
Ross J. Garofalo
ATTORNEY.

Patented Aug. 10, 1954

2,685,930

UNITED STATES PATENT OFFICE 2,685,930

OIL WELL PRODUCTION PROCESS

Frederick W. Albaugh, Richland, Wash., assignor to Union Oil Company of California, Los Angeles, Calif., a corporation of California Application August 12, 1948, Serial No. 43,962

5 Claims. (Cl. 166—39)

This invention relates to a method for treating well bores such as those employed in the production of gas or crude petroleum and particularly pertains to a method for increasing the productivity of such wells by decreasing the flow resistance through the permeable strata. In particular, this invention relates to a method for increasing the gas or crude petroleum production rate in gas or oil wells.

In the recovery of gas and/or crude petroleum from the subsurface it is the usual practice to drill a well from the surface of the earth to penetrate the particular subsurface strata in which a desirable fluid exists. This strata is generally a porous formation such as sandstone, and the like, in which the interstices between individual grains of solids making up the gas- or oil-bearing strata are filled with oil or gas or both, sometimes in the presence of water. By penetrating such a strata with the borehole and removing a fluid accumulating in the borehole opposite a permeable strata a migration of fluid occurs through the permeable formation. In wells for the production of gas or crude petroleum the maximum rate at which gas or crude oil can be recovered is dependent predominantly upon the resistance to flow offered by the permeable strata to the fluid.

Gas- and oil-producing strata vary considerably in constitution between different fields. It is known that often the permeable strata contain argillaceous materials and colloidal clays, and particularly is that the case in the California oil fields. It has now been found that the permeable strata containing such argillaceous materials may be advantageously treated according to the methods of this invention whereby wells penetrating such formations may be improved through increasing the relative permeability and increasing the fluid production rate.

It is an object of this invention to provide a method for increasing the production rate of a well bored into the subsurface.

It is an additional object of this invention to provide a method for increasing the permeability of the porous strata containing the fluid which it is desired to recover.

It is a further object of this invention to provide a process for the production of gas and crude petroleum from subsurface strata in which the permeable strata is treated to decrease fluid flow resistance.

Another object of this invention is to provide an improved process for completing an oil or gas well into an oil- or gas-producing strata so that productivity will be greater than by the conventional process.

Other objects and advantages of this invention will become apparent to those skilled in the art as the description and illustration thereof proceeds.

Briefly, the present invention comprises a method wherein a subsurface oil-bearing permeable strata from which it is desired to produce a fluid such as oil, gas, or water, is subjected to conditions of carefully controlled heating wherein changes are brought about apparently in the structure of the strata resulting in an increase in the permeability.

It has been found that by suitably heating permeable oil-producing strata to temperatures below about 350° C. a reversible loss of water occurs. When the thus heated materials are cooled, the water lost during heating is regained and no permanent changes in the nature of the solids are apparently effected. This water content variation below temperatures of about 350° C. or 660° F. is apparently completely reversible. However, it has been found that when these same permeable solids are heated to temperatures in excess of about 350° C. such as to temperatures above about 400° C., the water loss becomes irreversible, and it is apparent that a change in the solid structure occurs. The physical properties of a permeable solid thus treated are altered and the base exchange and other colloidal properties of the argillaceous materials present in the permeable solids are destroyed and the permeability to fluid flow is materially increased.

The immediate effect of performing such heating operations on permeable oil-bearing strata present in the subsurface is one in which a permeability increase permits an increased fluid production rate from that individual well by decreasing the resistance to fluid flow from the main body of the oil- or other fluid-bearing strata to the borehole. In the oil-bearing strata typical of the California oil fields the ability of the argillaceous materials to swell or otherwise increase their volume in the presence of certain liquids such as water is materially reduced by a heat treatment according to this invention and a further change is realized in the diminishing of the adverse effects noted on oil-bearing formations due to the presence of water. This adverse effect may be caused by water which eventually accumulates in an oil-bearing strata as the oil or gas is depleted, or they may be due to the presence of water lost from a drilling fluid through the walls of the borehole into the formation during drilling or the entry of water into the productive zone from any other source or cause.

In the preferred modification of this invention a borehole is drilled by extending downwardly therethrough a hollow drill tubing with a grinding bit attached to the lower end. As this bit is pressed against the lower extremity of the hole, which is termed the working face, the drill string or drill stem is rotated and the rock is ground away from the working face as the hole is deepened. During this drilling, a drilling fluid which may be of the water-base or oil-base types to those familiar and skilled in the art, is circulated downwardly through the hollow drill string, through the bit in contact with the working face, and upwardly to the surface through the annular space between the borehole walls and the drill stem. The fluid is thus circulated to cool and lubricate the bit, suspend drill cuttings and remove them from the hole, plaster the borehole walls with an impervious material which material prevents the loss of the fluid from the borehole into the surrounding formation and to fulfill other requirements. When the borehole is completed by the drilling method given above or by the cable tool drilling method sometimes employed, the fluids existing in the permeable strata may tend to accumulate in the hole. When the drilling tools and other equipment are removed from the hole, heating elements are introduced into the hole adjacent to the oil-bearing strata, and the permeable strata immediately adjacent the bore penetrating the formation is heated to a temperature in excess of 350° C. or about 660° F. to effect an irreversible water loss from the strata and a desirable increase in the oil-bearing strata permeability. This heating may be carried out either in the presence of the fluid subsequently to be produced from the permeable strata or in its absence. In one modification of this invention the well is subjected to external pressure from gases or chemically and thermally inert liquids introduced via line 26 shown in the drawings into the hole while the heating elements are in place. The fluids normally accumulating within the bore are thus driven back into the permeable formation so that any tendency toward thermal decomposition of the fluid to be produced or chemical reaction with materials present are avoided. With some fluids, such as with water, gases, molten sulfur, etc., such a procedure is unnecessary. However, in the treatment of crude petroleum-bearing strata, it is desirable to employ heating in the absence of the crude petroleum particularly where petroleums having low thermal decomposition temperatures are present.

The invention will be more clearly understood by reference to the accompanying drawing in which Figures 1, 2, and 3 illustrate various suitable methods of heating subsurface strata according to this invention.

The heating elements referred to above in the preferred modification of this invention are more clearly shown in Figure 1 and may comprise a suitable form of electrical heater 10 such as a resistance coil 11 which may be suspended within the bore 12 opposite the permeable strata 13 to be heated. If desired, the resistance heater may be positioned in mechanical contact with the borehole walls 14 so that heat is conveyed by conduction from the heater into the strata, or the heater may be centrally located within the bore by means of suitable packers or spacers 16 so that the heating elements do not directly contact the strata. In this latter instance the heat may be radiated from the heating element across the intervening space 17 to the permeable strata to be heated.

In another modification of this invention is shown in Figure 2 in which a heating element comprising a radiating antenna 18 may be extended downwardly through the borehole 12 and positioned adjacent to the strata 13 and employed to radiate electromagnetic energy preferably within the radio-frequency range from the antenna to be absorbed in the permeable strata 13 which it is desired to heat. A frequency of from about 30 kc. to as high as about 3,000 megacycles may be employed, frequencies in the range of from about 3,000 kilocycles to about 30 megacycles or higher being particularly adaptable to this service. The radiating antenna is suitably connected by means of a transmission line 19 having low energy loss characteristics and electromagnetic radio-frequency energy generated by a suitable radio frequency electromagnetic energy generator mechanism 20 is transferred thereby to the antenna. Such a transmission line may comprise a parallel pair of conductors 21 and 22 uniformly spaced and insulated from each other, such as a coaxial cable, a parallel open wire or a twisted pair transmission line, or it may comprise a hollow wave guide, or the like.

In another modification, shown in Figure 3, the heating of the permeable strata may be effected by positioning a heater 23 opposite the permeable strata 13 in which a combustible material such as gas or liquid is burned with an oxygen-containing gas and the resulting hot products of combustion are circulated across the face 14 of the permeable strata. In performing this particular operation a pair of conduits 24 and 25 is extended downwardly through the well bore 12 to the heating mechanism, one carrying the liquid or gas to be burned, and the other carrying the fluid to support the combustion. Gaseous diluents may be used such as recirculated flue gas to effect temperature control. The use of natural gas and air is particularly well adapted to this mode of heating when the heating is carried out in wells for the production of petroleum.

The temperature to which the permeable strata must be heated in order to effect the desirable results disclosed herein may vary somewhat from the value of about 350° C. given above. This temperature has been found to be a critical temperature for the type of colloidal argillaceous materials encountered in the permeable sands of the California oil fields. It is conceivable that in other locations and with other types of permeable fluid containing strata this critical temperature may depart appreciably from the critical value. Critical temperatures of as low as 200° C. may be encountered in particular locations and it is not the intention of this disclosure to limit the heating to any particular temperature except that temperature to which it is required to convert the argillaceous materials present to a form in which they exhibit no base exchange capacity or other colloidal properties and to a temperature at which an irreversible water loss occurs.

The operation of the present invention as applied to a particular oil-bearing strata may be more readily understood by reference to the following example:

Example

An electrical heater capable of dissipating electrical energy at the rate of 25 kilowatts is lowered to a depth of 4250 feet to a position opposite the permeable oil-bearing strata in the well. In a well bore having a diameter of 6½ inches, a tubular heater 4 inches in diameter, and 21 feet long is used. The heater should be provided at its upper and lower extremities with means for aligning it with the vertical axis of the well bore out of direct contact with the strata when radiation heating is to be employed. Suitable electrical conductors are attached to the heater and extended to the surface where they are connected to a gasoline driven motor generator set or other source of electrical power. Natural gas is pressured into the well to a pressure of 1500 pounds per square inch to force liquids accumulating in the borehole into the formation. The oil-bearing strata, subjected to the heating effects for a period of six days, reached a maximum temperature of 375° C. as indicated by thermocouples 27 in contact with the borehole face 14. At the end of this period the heating is discontinued and the temperature allowed to fall. When it reaches a value of about 175° C. the pressure from the well is released and the well replaced on production by means of conventional pumping equipment. Where the production rate of the well had been steady at 21 net barrels of 17° A. P. I. gravity crude petroleum prior to the heating treatment, the production rate subsequent to the heating treatment increased markedly and after several months it remained steady at 37 net barrels of crude petroleum per day. Thus this production increase of 16 barrels a day was a permanent and not a temporary increase due to viscosity lowering effects of raising the formation temperature.

The beneficial effects of the process of this invention when applied to oil wells immediately after drilling have resulted in wells having initial productivities substantially above those in the immediate vicinity.

Although the discussion has been primarily directed to the treatment of oil wells, it is not intended to limit the scope of this invention since the method of treatment and the process for drilling may be applied to other types of wells such as those producing natural gas, water, sulfur, and the like.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for treating formations penetrated by a borehole and containing argillaceous colloidal constituents which comprises subjecting at least part of said formations immediately adjacent the borehole to heating to raise the temperature thereof above about 350° C. to destroy the colloidal properties of colloidal constituents contained in said formations but insufficiently to adversely effect the permeability of said formations so treated.

2. A method for treating oil and gas well bores which comprises displacing oil and gas from the well bore into the permeable strata penetrated thereby, heating the permeable strata and colloidal constituents therein immediately adjacent said bore to a temperature above about 350° C. to destroy the colloidal properties of said colloidal components and to increase the fluid permeability thereof, subsequently allowing the thus heated strata to cool and flowing the displaced gas and oil through the thus treated permeable strata of increased permeability into the treated well bore at an increased rate.

3. A method according to claim 2 wherein said oil and gas is displaced from the permeable strata by applying external gas pressure to the well bore.

4. A method according to claim 2 wherein natural gas is pumped into the well bore to a pressure sufficient to force fluids within the well back into the permeable formation to be heated.

5. A method for increasing oil and gas well productivity by eliminating the adverse effects of water upon permeable formations containing argillaceous constituents and penetrated by a well bore which comprises the steps of displacing fluids from the producing well bore and from the permeable strata immediately adjacent thereto, heating said strata and the argillaceous constituents contained therein to a temperature of about 350° C. and sufficient to cause destruction of the reversible water loss and gain properties of said argillaceous constituents in said strata to effect a permanent permeability increase thereof, said temperature being insufficient to decrease the permeability of said strata, discontinuing the heating, removing said heater from said well bore, allowing the heated strata to cool to the normal formation temperature, flowing oil and gas through the thus treated permeable strata and producing oil and gas from said well bore at an increased rate due to the increased permeability of the thus treated permeable strata.

References Cited in the file of this patent

UNITED STATES PATENTS

| Number | Name | Date |
|---|---|---|
| 797,529 | Oliphant et al. | Aug. 15, 1905 |
| 1,152,392 | Breitung et al. | Sept. 7, 1915 |
| 1,361,282 | Nolan | Dec. 7, 1920 |
| 2,110,236 | Nolan | Mar. 8, 1938 |
| 2,134,610 | Hogg | Oct. 25, 1938 |
| 2,186,035 | Niles | Jan. 9, 1940 |
| 2,382,471 | Frey | Aug. 14, 1945 |
| 2,472,445 | Sprong | June 7, 1949 |
| 2,506,853 | Berg et al. | May 9, 1950 |

OTHER REFERENCES

Inorganic Colloid Chemistry, Weiser, vol. III, The Colloidal Salts, 1938, pages 405–408.